Jan. 24, 1950

J. H. LONG 2,495,271

UNITARY SPRING AND PRINTER BLADE
FOR FACSIMILE RECORDERS

Filed April 12, 1947

JOHN H. LONG
*INVENTOR.*

BY Alfred W. Barber
ATTORNEY

Jan. 24, 1950 J. H. LONG 2,495,271
UNITARY SPRING AND PRINTER BLADE
FOR FACSIMILE RECORDERS
Filed April 12, 1947 2 Sheets-Sheet 2

JOHN H. LONG
*INVENTOR.*

BY *Alfred W. Barber*
ATTORNEY

Patented Jan. 24, 1950

2,495,271

UNITED STATES PATENT OFFICE 2,495,271

UNITARY SPRING AND PRINTER BLADE FOR FACSIMILE RECORDERS

John H. Long, Jackson Heights, N. Y., assignor to Faximile, Inc., New York, N. Y., a corporation of Delaware Application April 12, 1947, Serial No. 741,077

12 Claims. (Cl. 346—101)

The present invention concerns electrical recorders, and, in particular, improved electrode structures.

One object of the present invention is to provide a new and improved linear electrode structure for use with a helical electrode in a recorder adapted for facsimile recording and the like.

Another object of the present invention is to provide, in a recorder embodying helical and linear electrodes, a linear electrode capable of more accurate recording than those hitherto available.

Still another object of the present invention is to provide a cheaper, simpler, and generally improved linear electrode structure adapted to cooperate with a helical electrode for recording upon electrically sensitive surfaces.

Still another object of the present invention is to provide a linear electrode structure which will maintain its accuracy in the presence of considerable wear of the recording edge and which requires little if any adjustment during its operation.

A further object is to provide a linear electrode which may be readily removed or inserted in the recorder.

These and other objects of the present invention will be apparent from the detailed description of the invention given in connection with the various figures of the drawings.

There are many applications for recorders capable of recording electrical signals but one of the most important and exacting uses is in the art of facsimile. One of the most useful types of electrical recorders particularly in the facsimile art employs a rotating helix and a stationary linear electrode with a record sheet passed between the two. The linear electrode presses the recording sheet against the helical electrode which as it rotates causes a scanning spot to traverse a line across the sheet. A slow uniform advance of the record sheet completes the scanning operation. Electrical signals impressed between the helical and linear electrodes cause density variations in the record sheet which, in particular, may be an electrolytic recording sheet. The density variations caused by the electrical signals correspond to density variations in an original copy which it is desired to reproduce by facsimile methods. It has been found that record sheets which are conveniently made of paper may be more satisfactorily recorded upon if the linear electrode is flexible. This flexibility is especially important in the case of electrolytic recording sheets since these sheets are damp at the time of recording and their strength is somewhat less than it would be with a dry sheet. These flexible linear electrodes have been particularly described in U. S. Patent Nos. 2,202,855 and 2,380,467.

The present invention concerns a flexible, linear, low inertia electrode suitable for electrical recording especially in the art of facsimile based on the principles set forth in the above enumerated patents but embodying certain important improvements. Briefly, the present invention concerns a long, thin printing blade held or formed at the end of a plurality of flexible spring fingers. The ends of the spring fingers remote from the printing edge are rigidly held in clamps. At an intermediate point between the printing edge and the clamping means a stop is provided to limit the motion of the printing edge at least in the direction of the recording sheet. The construction of this electrode is extremely simple as it may be stamped and bent from a single piece of flexible material. It has been found to be extremely efficient and accurate in its operation and to require a minimum of adjustment during its useful life. Since the spring fingers are relatively long a considerable amount of wear may take place along the printing edge which causes the printing edge to lower in the direction of the recording sheet without changing the effective pressure or accuracy. An alternate method of construction would be to fasten, preferably by welding, a plurality of spring fingers on to a thin printing edge member. In either case the structure is also extremely light which is desirable since pressure from the helix through the paper will cause the printing edge to raise or lower without requiring an undue amount of force. This is particularly important in high speed recording as it allows irregularities in the paper surface to be followed without cutting or damaging the recording sheet.

Figure 1:
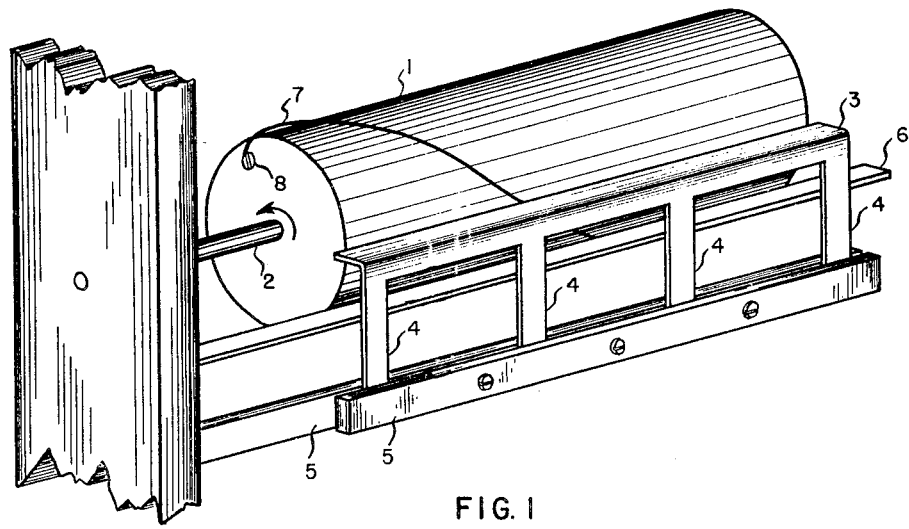
Fig. 1 shows a simplified perspective view of one form of the present invention.

Fig. 1 shows a recording drum 1, supporting helical electrode 7. Drum 1 is mounted on shaft 2, and helical electrode 7 is secured at one end by screw 8, and at the other end by means not shown. The linear electrode is shown comprising the printing edge 3, and the integral spring fingers 4, clamped between rigid members 5 and 5. The motions of printing edge 3 are limited to a predetermined amount by stop bar 6. While it is not shown it will be understood that the recording sheet is drawn across electrode 7 and under printing edge 3. Other details of the recorder whether it be for general recording purposes or for facsimile will be any suitable devices familiar to those in the art and not shown in the present drawings. Printing edge 3, consists essentially of a strip of material bent to form a substantially right angle piece and spring fingers 4 are attached or form an integral part of the part which is at right angles to the actual printing edge. For electrolytic recordings requiring an iron-bearing linear electrode, the present linear electrode may conveniently be formed of spring steel. The material should be thin so that the printing edge will form a fine line at its intersection with the helical electrode. The thickness of the material and the relative width of the two right angle portions will be determined by the desired definition of the recording, speed of marking, and desired flexibility perpendicular to the helix and the desired rigidity tangential to the helix.

Figure 2:
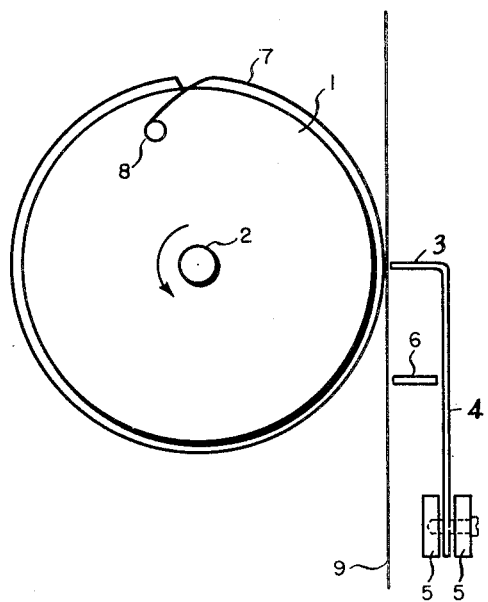
Fig. 2 shows an end view of the form of the invention shown in Fig. 1.

Fig. 2 shows an end view of the present invention as shown in Fig. 1 and is useful in showing particularly the vertical relationship of the various parts. Fig. 2 shows drum 1, mounted on shaft 2, and supporting helix 7 secured at point 8. It also shows record sheet 9 passing over the surface of helix 7 and linear electrode 3 mounted at the ends of springs 4 which in turn are secured and rigidly held by mounting blocks 5 and 5. This view also shows stop 6 which limits the motion of printing edge toward the paper. Since printing edge 3 is flexible as set forth there is a tendency for it to move toward the surface of drum 1, at points remote from its contact point with helix 7 to recording sheet 9. Stop 6 should be positioned to prevent printing edge 3 from contacting the surface of drum 1 at any point during the revolution of helix 7. As the printing edge wears springs 4 will bring it back to its normal printing position until a point is reached in which it cannot contact helix 7 through sheet 9. When this occurs at any point in the revolution of helix 7 the linear electrode should be replaced. It will be appreciated that the linear electrode of the present invention is cheap and simple to make, and although it has a long useful life it may be readily replaced when the occasion demands.

Figure 3:
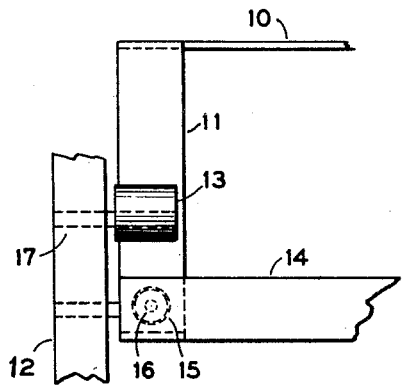
Fig. 3 shows details of a modified form of the present invention.

Fig. 3 shows a modified form of the present invention in a partial view. One end of printing edge 10 and a single spring finger 11 is shown with mounting support 14. A convenient device for varying the position of the printing edge 10 and the pressure on the record sheet consists in the eccentric cam 13 mounted by means of shaft 17 in frame 12. The end of finger 11 is held by means of spring 15 and retaining ball 16 described in more detail below.

Figure 4:
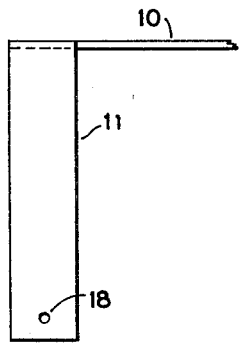
Fig. 4 shows a portion of the device of Fig. 3.

Fig. 4 shows how finger 11 may have a small round hole 18 near its end to engage retaining ball 16.

Figure 5:
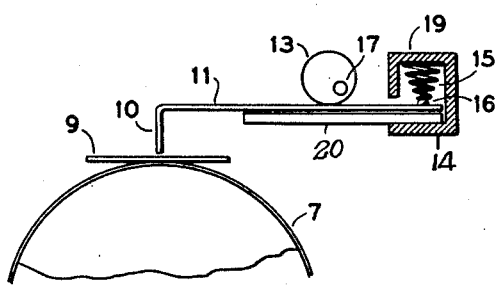
Fig. 5 shows a side view of the details of Fig. 3 showing the relationship between the linear electrode, recording sheet and drum.

Fig. 5 shows more details of the form shown in Fig. 3 in a side view. This view shows recording sheet 9 and recording helix 7 below it. It shows an end view of cam 13 and shaft 17. A stiff spring leaf 20 acts as a stop or motion limiting means. Cam 13 bearing on leaf 20 through spring 11 serves to adjust the position of printing edge 10 and its pressure on sheet 9. This view also shows frame 14 holding spring 15 and retaining ball 16 engaging hole 18 in spring 11. Each of the several springs 11 (corresponding to the four springs 4 in Figs. 1 and 2) is similarly retained, providing accurate alignment of the printing edge. It will be seen that the electrode may be easily removed and replaced by pulling it outward releasing hole 18 from ball 16 to remove, and pushing back into engagement to replace where it will snap into place.

While only two embodiments of the present invention have been shown and described many variations will be apparent to those skilled in the art within the spirit and scope of the invention as set forth in the appended claims.

What is claimed is:

1. In an electrical recording device, the combination of, a rotatable helical electrode and a flexible linear electrode for cooperating to mark a record sheet passing therebetween, said linear electrode comprising a structure including a thin linear printing edge and a structure continuation bent substantially at right angles including a plurality of leaf spring means for urging said printing edge toward said recording sheet, and means for rigidly holding the ends of said spring fingers remote from said printing edge.

2. In an electrical recording device, the combination of, a rotatable helical electrode and a flexible linear electrode for cooperating to record upon a recording sheet passing therebetween, said linear electrode comprising a structure including a linear marking edge and at substantially right angles thereto a plurality of flexible spring fingers for urging said edge toward said helix, and a stop for limiting the motion of said printing edge in the direction of said recording sheet.

3. In a helical and linear electrode form of recorder, a linear electrode including a thin strip of metal bent substantially at right angles to form a marking edge in one direction and supporting means in the other, and a plurality of leaf springs extending from said supporting means to rigid holding means to provide soft spring action at the printing edge.

4. A linear electrode as set forth in claim 3 and including a stop for limiting the motion of said electrode in the direction of the helical electrode.

5. A linear marking electrode for cooperating with a helical electrode to mark a record sheet moving therebetween, said linear electrode including a thin marking edge held by spring means long compared to the width of said edge, said edge being mounted solely by means of said spring means to provide compliance of said edge perpendicular to said sheet and comparative rigidity in two dimensions parallel to said sheet.

6. A linear marking electrode for cooperating with a helical electrode to mark a record sheet moving therebetween, said linear electrode including a thin marking edge held by spring means long compared to the width of said edge and mounted solely by means of said spring means to provide compliance of said edge perpendicular to said sheet and comparative rigidity in two dimensions parallel to said sheet, and a stop for limiting the motion of said edge at least in the direction of said sheet.

7. A linear marking electrode for cooperating with a helical electrode to mark a record sheet therebetween, said linear electrode consisting of a sheet of thin steel bent substantially at right angles to form a narrow marking edge and cut out to provide increased compliance of said edge in a direction perpendicular to said sheet.

8. A linear marking electrode for cooperating with a helical electrode to mark a record sheet therebetween, said linear electrode consisting essentially of a thin sheet of steel bent substantially at right angles to form a narrow marking edge and cut out in the body of the sheet to form finger-like springs to increase the compliance of said edge in a direction perpendicular to said sheet and means for rigidly holding the ends of said springs remote from said marking edge to provide rigidity parallel to said sheet.

9. A linear electrode for an electrical recorder including at least two main portions, one of said portions comprising a long, thin marking edge, the other of said portions comprising a plurality of flat springs projecting substantially at right angles to the said first portion for supporting said edge, and portions near the ends of said springs remote from said edge formed to receive a detent mounting means.

10. A linear electrode for an electrical recorder including at least two main portions, one of said portions comprising a long, thin marking edge, the other of said portions comprising a plurality of flat springs projecting substantially at right angles to the first said portion for at least partially supporting said edge, and additional springs for increasing the stiffness of the first said springs over at least a portion of their length.

11. A linear electrode structure including a long, thin marking edge held at the ends of a plurality of leaf springs, a mounting frame, detent devices in said frame for removably engaging the ends of said springs remote from said edge holding ends, and a cam for depressing at least one of said springs to press said edge upon a surface to be marked.

12. A linear electrode structure, including in combination, a long, thin marking edge supported by a plurality of leaf springs, means for mounting said springs to hold said edge along a predetermined path and means for pressing at least one of said springs to control the pressure of said edge upon a surface to be marked.

JOHN H. LONG.

REFERENCES CITED

The following references are of record in the file of this patent:

UNITED STATES PATENTS

| Number | Name | Date |
|---|---|---|
| Re. 20,152 | Young | Oct. 27, 1936 |
| 2,131,547 | Artzt | Sept. 27, 1938 |
| 2,135,028 | Bokovoy et al. | Nov. 1, 1938 |
| 2,227,109 | Shankweiler | Dec. 31, 1940 |
| 2,415,229 | Young | Feb. 4, 1947 |